G. W. BRUCE.
POTATO HARVESTER.
APPLICATION FILED FEB. 19, 1918.

1,296,475.

Patented Mar. 4, 1919.

INVENTOR.
GEO. W. BRUCE.
BY HIS ATTORNEY:
A. M. Carlson.

UNITED STATES PATENT OFFICE.

GEORGE W. BRUCE, OF LARIMORE, NORTH DAKOTA.

POTATO-HARVESTER.

1,296,475.

Specification of Letters Patent.

Patented Mar. 4, 1919.

Application filed February 19, 1918. Serial No. 218,163.

*To all whom it may concern:*

Be it known that I, GEORGE W. BRUCE, a citizen of the United States, residing at Larimore, in the county of Grand Forks and State of North Dakota, have invented a new and useful Potato-Harvester, of which the following is a specification.

My invention relates to potato harvesters; and the object is to provide a machine which will dig the potatoes, separate them from the dirt and vines, and deposit them into piles on the field in convenient order to be later shoveled into a wagon.

Figure 1:
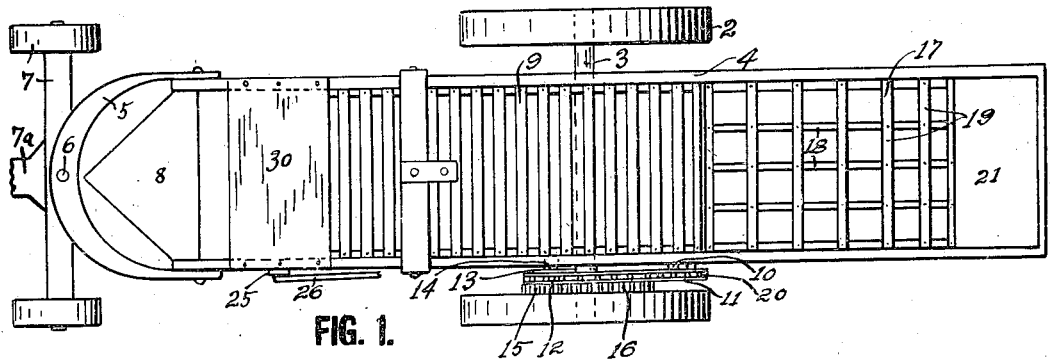
Figure 2:
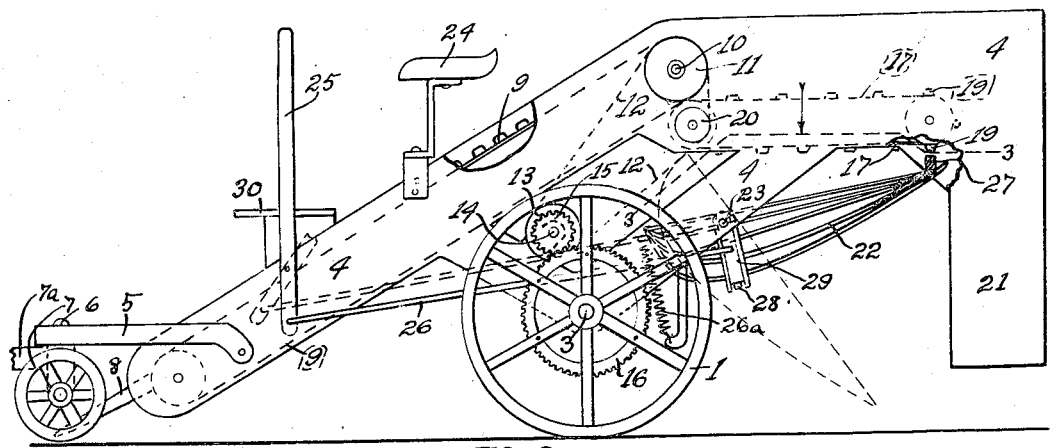
Figure 4:
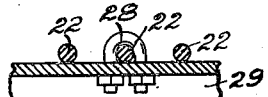
Figure 3:
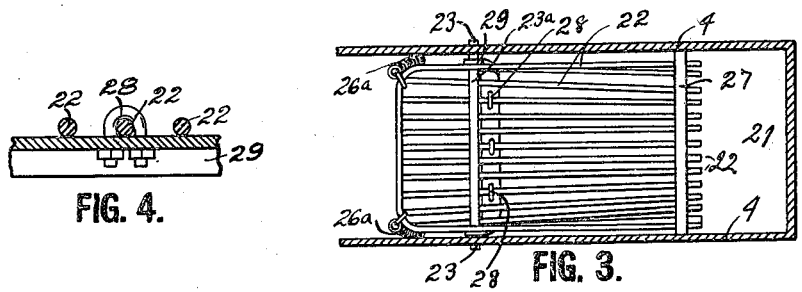

In the accompanying drawing, Figure 1 is a top or plan view of my potato harvester. Fig. 2 is a side elevation of the machine shown in Fig. 1. Fig. 3 is a detail sectional view on the line 3—3 in Fig. 2. Fig. 4 is an enlarged detail view of one of the U-bolts or clips 28 showing how it secures together the brace 29 and the bars of the carrier or dumping device 22.

Referring to the drawing by reference numerals, 1, 2 designate the main supporting wheels and 3 the main axle of the harvester. Said axle is journaled in the frame 4 of the machine. The front end of the machine is provided with a draft arrangement consisting of a bail 5 which is pivotally connected at 6 to a small truck 7 having a pole 7ª. At the front end of the machine is also provided a digging shovel 8, which, as the machine moves forward, digs the potatoes and delivers them up onto the inclined elevator 9. The shaft 10 of the upper roller of this elevator is provided with a sprocket-wheel 11 which is connected by a sprocket chain 12 to a sprocket pinion 13. The pinion 13 is secured to an idler shaft 14 which is journaled in the frame 4. On said shaft 14 I also secure a pinion 15, meshing with a gear-wheel 16 which is secured to the ground wheel 1, or if so desired, 14 may be a stud on which the gear 15 and sprocket 13, secured together, rotate. Below the upper end of the elevator 9 I arrange an endless carrier or conveyer 17, whose traveling apron consists of endless straps 18 to which are secured transverse slats 19; said slats and straps being separated sufficiently to let potatoes drop through the upper and lower runs thereof. The front roller of the apron 17 is provided with a shaft 20 having a sprocket 20ª arranged to mesh with and thus be operated by the sprocket chain 12.

When the machine moves forward the potatoes, their vines and some dirt will pass from the shovel 8 up onto the elevator 9 between the slats of which most of the dirt will fall. But the potatoes and vines will be carried up and dropped onto the carrier 17, through the meshes of which the potatoes will fall, but the vines will be carried by the apron into the chute 21, where they will drop to the ground, guarded by the chute as a wind shield.

I mount a scoop-shaped basket 22 under the carrier 17 to catch and carry the potatoes that drop therethrough. Said basket is trunnioned by a shaft 23ª or by simple trunnions 23 in the sides of the frame 4 (see Fig. 3), and is arranged to swing with its rear end downward as shown by dotted lines in Fig. 2. Such swinging of the basket is for the purpose of emptying it, and is caused by the operator who generally sits on the seat 24 and by operating the lever 25 pulls the connecting rod 26, which connects the lever 25 with the basket, forward (see dotted lines in Fig. 2). The basket is normally held in an upward position by means of two springs 26ª which tend to pull the front end of the basket downward. The rear end of the basket is prevented from going too high by a cross bar 27. This cross-bar is so placed that it will leave exposed the rear ends of the basket tines or bars (as shown in Figs. 2 and 3) for the purpose of catching and dislodging vines that would have a tendency to cling to and follow the underside of the carrier 17 instead of dropping through the chute 24 to the ground.

The basket is adjustable back and forth by having some of its bars secured by U-bolts 28 to its supporting bail 29. The latter is preferably made of channel-iron (see Figs. 2 and 4) and is connected by the rod 26 to the operating lever 25. 30 is a supporting board for the feet of the operator.

The operation of the machine having already been partly stated I will here only further add that the skeleton form of the basket assists in separating sand and dirt from the potatoes and that the springs 26ª merely serve to restore the emptied dumping basket 22 to normal position. They do not yield and let the basket dump when it gets full, for if they did the heaps of potatoes might not be placed in rows across the line of travel of the machine so as to be conveniently shoveled in at both sides of a wagon simultaneously. The latter result is obtained by pulling the lever 25 when the operator sees that the machine is alongside of any heap of potatoes deposited during the next previous drive. He may even keep his foot against the lever 25 to prevent too early dumping where the yield of potatoes is extra rich.

Every time the basket is tilted downward at its rear end so as to deposit its contents on the ground the rear ends of the tines tend to dislodge and move downwardly any vines which may have lodged near said tines, it being understood that the wind-shield or chute 21 is open in its forward side.

What I claim is:

1. In a potato harvester, a skeleton vine conveyer, a receptacle mounted to receive the potatoes from the conveyer which by a tilting movement deposits them in heaps on the ground, means for tilting said receptacle at will so as to empty it, a forwardly open substantially vertical chute arranged to guide the vines to the ground, and fingers at the rear end of the receptacle for dislodging vines if they stick in the upper end of the open front side of the chute, where the lower run of the conveyer starts on its forward movement.

2. In a potato harvester, a receptacle arranged to tilt and deposit the potatoes in spaced heaps on the ground, said receptacle being formed with longitudinal spaced bars and a downwardly arched bar having perforations, and U-shaped bolts in said perforations and adjustably securing the arch across the underside of the longitudinal bars, the ends of said arched bar being trunnioned in the main frame of the machine so as to support the receptacle in a tiltable position.

In testimony whereof I affix my signature.

GEO. W. BRUCE.